United States Patent [19]
Manno

[11] Patent Number: 5,694,715
[45] Date of Patent: *Dec. 9, 1997

[54] KNOTLESS LINE SPLICERS

[75] Inventor: Joseph T. Manno, Kane, Pa.

[73] Assignee: Whistlin Wire, Inc., Warren, Pa.

[*] Notice: The term of this patent shall not extend beyond the expiration date of Pat. No. 2,596,832.

[21] Appl. No.: 515,710

[22] Filed: Aug. 16, 1995

Related U.S. Application Data

[63] Continuation-in-part of Ser. No. 430,840, Apr. 28, 1995, Pat. No. 5,596,832.

[51] Int. Cl.⁶ ............................................. A01K 91/00
[52] U.S. Cl. ................................................ 43/44.83
[58] Field of Search ............................ 43/44.83, 44.98

[56] References Cited

U.S. PATENT DOCUMENTS

| | | |
|---|---|---|
| 279,206 | 6/1883 | Van Altena . |
| 372,686 | 11/1887 | Lester ........................... 43/44.83 |
| 454,581 | 6/1891 | Mack . |
| 469,015 | 2/1892 | Hemenway . |
| 724,362 | 3/1903 | Wilson ........................... 43/44.83 |
| 724,363 | 3/1903 | Wilson . |
| 1,002,981 | 9/1911 | Ford ............................... 43/44.98 |
| 1,158,957 | 11/1915 | Bates ............................. 43/44.98 |
| 1,227,325 | 5/1917 | Schilling . |
| 1,779,343 | 10/1930 | Sylvanne ....................... 43/44.83 |
| 2,222,277 | 11/1940 | Baker ............................. 43/44.83 |
| 2,518,634 | 8/1950 | Peterson . |
| 2,532,045 | 11/1950 | Walsh . |
| 2,616,208 | 11/1952 | Stogemayr ..................... 43/44.83 |
| 2,621,438 | 12/1952 | Helin . |
| 2,750,704 | 6/1956 | Bemis . |
| 2,754,615 | 7/1956 | Toil ................................ 43/44.83 |
| 2,796,695 | 6/1957 | Meulnart . |
| 2,870,563 | 1/1959 | Rose . |
| 2,926,454 | 3/1960 | Gottman . |
| 2,984,882 | 5/1961 | Winn . |
| 2,984,930 | 5/1961 | Fadely . |
| 3,002,310 | 10/1961 | Ferguson . |
| 3,453,769 | 7/1969 | Chandler . |
| 3,778,921 | 12/1973 | Peterson . |
| 3,785,011 | 1/1974 | Marks ............................ 43/44.83 |
| 3,798,824 | 3/1974 | Nikota . |
| 3,936,971 | 2/1976 | McGahee . |
| 4,107,866 | 8/1978 | Manno . |
| 4,209,933 | 7/1980 | Manno . |
| 4,232,470 | 11/1980 | Steffick, Jr. . |

(List continued on next page.)

FOREIGN PATENT DOCUMENTS

| | | |
|---|---|---|
| 1123195 | 5/1982 | Canada . |
| 23462 | 5/1908 | United Kingdom . |
| 2030032 | 4/1980 | United Kingdom ............ 43/44.83 |

*Primary Examiner*—Kurt Rowani
*Attorney, Agent, or Firm*—Nixon & Vanderhye P.C.

[57] ABSTRACT

A combination line splicer and line connection wherein the splicer includes a relatively straight and relatively rigid shank, formed with a pair of open eyes, one at each of two opposite ends thereof. A pair of lines are securely fastened to the splicer by a knotless arrangement wherein the lines are wrapped about the shank such that the lines are intertwined, and pulled into respective ones of the pair of open eyes. A method of securing a pair of lines extending in generally opposite directions to a splicer, wherein the splicer includes a shank and open eyes on the shank for securing the pair of lines to the splicer in a knotless manner, opposite ends of the shank, the method comprising the steps of:

a) orienting ends of the lines in generally overlapped relationship;

b) wrapping a first portion of the overlapped ends about a first portion of the shank such that the overlapped lines become intertwined, and pulling the first portion of the overlapped ends into one of the open eyes;

c) turning the splicer end-over-end and wrapping a second portion of the overlapped ends about a second portion of the shank such that the overlapped lines become intertwined, and pulling the second portion of the overlapped ends into the other of the open eyes.

9 Claims, 4 Drawing Sheets

U.S. PATENT DOCUMENTS

| | | |
|---|---|---|
| 4,294,031 | 10/1981 | Manno . |
| 4,819,366 | 4/1989 | Manno . |
| 4,905,403 | 3/1990 | Manno . |
| 5,009,025 | 4/1991 | Austad .................................. 43/44.83 |
| 5,265,370 | 11/1993 | Wold . |
| 5,373,658 | 12/1994 | Huppert . |

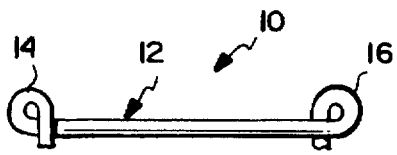
Fig. 1
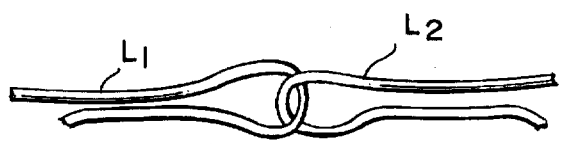
Fig. 1A
Fig. 1B  Fig. 1C
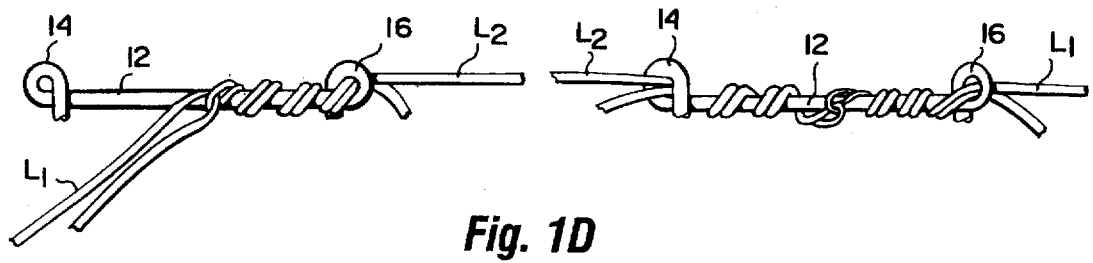
Fig. 1D
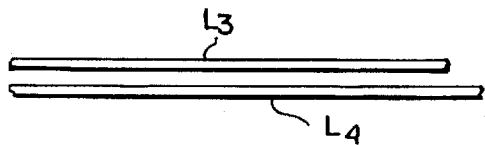
Fig. 1E  Fig. 1F
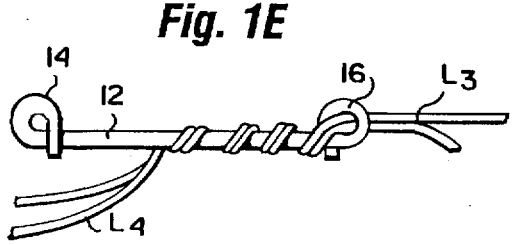
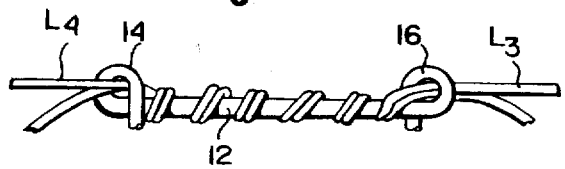

KNOTLESS LINE SPLICERS

RELATED APPLICATIONS

This application is a continuation-in-part application of Ser. No. 08/430,840 filed Apr. 28, 1995, now U.S. Pat. No. 5,596,832.

This invention relates to one-piece splice members particularly adapted for connecting flexible lines such as fishing lines.

BACKGROUND

Line connectors or splicers in the fishing equipment field are not new. Representative examples of connector devices may be found in U.S. Pat. Nos. 2,984,882 and 3,936,971. There remains a need, however, for a sturdy line splicer which is strong and easy to use, particularly in the sense that it does not require the tying of knots to secure the lines to the splicer.

SUMMARY OF THE INVENTION

In accordance with the variously disclosed embodiments in this invention, line splicers are disclosed which incorporate knotless line securement features similar to those disclosed in my prior U.S. Pat. Nos. 4,107,866; 4,209,933; 4,294,031; 4,819,366; and 4,905,403.

In accordance with a first exemplary embodiment of the invention, a line splicer is provided which includes a relatively straight, rigid wire which terminates at opposite ends in open loops or eyes. Lines extending in opposite directions may be secured to the splicer quickly and easily, without tying any knots. For example, the two lines may be looped together, wrapped several times around the straight shank portion and then pulled into the open eye at one end of the shank, turned end for end, and then wrapped about the shank towards the other eye and then pulled into the latter, as described in further detail hereinbelow.

Lines may be secured to the above described splicer, however, without having to first loop the lines together as described above. Thus, the lines may simply be overlapped in a substantially parallel orientation and then wrapped about the shank (from the middle of the shank outwardly toward the opposite ends) and pulled into the open eyes at opposite ends of the splicer, substantially described above.

In a second exemplary embodiment, the splicer incorporates a T-bend intermediate the open loops or eyes at the opposite ends of the splicer. One line may be looped over the T-bend, wrapped around one portion of the shank and pulled through an open eye at the end of the shank. The same procedure is then followed with the other line to complete the spliced connection.

In a third exemplary embodiment of the invention, an open eye or loop is located in the straight shank portion, intermediate the opposite ends which incorporate two smaller open loops or eyes. Here again, one line loop may be pulled into the larger open eye in the middle of the splicer, wrapped about the shank and then pulled into one of the open eyes at one end of the splicer. A similar procedure may be followed for the other of the two lines.

In accordance with this continuation-in-part application, a procedure for wrapping the line (or cable or the like) about the splicer shank results in an especially strong splice joint. More specifically, two strands of a looped line, or of two overlapped lines as described in any of the three embodiments above, are wrapped about the shank so that they become intertwined with each other along the shank. When tension is applied to the spliced line, the overlaid or intertwined strands grip each other tightly and enhance the joint strength significantly.

While the above described splicer elements are particularly advantageous in the context of securing fishing lines, the splicers may be scaled upwardly to a larger size to handle stronger and larger diameter lines or strands including steel cable, chains, etc. In the latter case, clamps are not necessary to hold the cables together. The friction of the cable wrapped about the shank of the splicer, bearing on and intertwined with one another, works very well and transfers much of the load to the cables themselves through friction, and without kinking the cable material. It will be appreciated that the open eyes and T-bends are sized as necessary to accommodate the strand diameter.

On the whole, the splicer elements in accordance with this invention provide a means for joining similar and dissimilar strands together without tying a knot and without damaging the materials, while at the same time, maximizing line strength. In the fishing and in other applications, for example, the splice strength is at least as great as the tensile strength of the spliced lines.

Therefore, in accordance with its broader aspects, the present continuation-in-part application relates to a combination line splicer and line connection wherein the splicer consists of a relatively straight and relatively rigid shank, formed with a pair of open eyes, one at each of two opposite ends thereof; and a pair of lines securely fastened to the splicer by a knotless arrangement wherein the lines are wrapped about the shank in one direction such that the lines are intertwined, and pulled into respective ones of the pair of open eyes.

In another aspect, the invention relates to a method of securing a pair of lines extending in generally opposite directions to a splicer, wherein the splicer includes a shank and open loops on the shank for securing the pair of lines to the splicer in a knotless manner, opposite ends of the shank, the method comprising the steps of:

a) orienting ends of the lines in generally overlapped relationship;

b) wrapping a first portion of the overlapped ends about a first portion of the shank such that the overlapped lines become intertwined, and pulling the first portion of the overlapped ends into one of the open eyes;

c) turning the splicer end-over-end and wrapping a second portion of the overlapped ends about a second portion of the shank such that the overlapped lines become intertwined, and pulling the second portion of the overlapped ends into the other of the open eyes.

In still another aspect, the invention relates to a method of securing a pair of lines extending in generally opposite directions to a splicer, wherein the splicer includes a shank portion, a pair of open eyes at respective opposite ends of the shank, and a line attachment structure formed in the shank intermediate the pair of open eyes, comprising the steps of:

a) looping a first line about the line attachment structure to form first overlapped strands;

b) wrapping the first overlapped strands about the shank portion towards one of the pair of open eyes so that the first overlapped strands are intertwined, and pulling the first overlapped strands into the one open eye;

c) looping a second line about the line attachment structure to form second overlapped strands; and d) wrapping the second overlapped strands about the shank portion towards the other of the pair of open eyes so that the second overlapped strands are intertwined, and pulling the second overlapped strands into the other of the open eyes.

Additional objects and advantages will become apparent from the detailed description which follows.

BRIEF DESCRIPTION OF THE DRAWINGS

FIG. 1 is a side elevation of a line splicer in accordance with a first exemplary embodiment of the invention;

FIG. 1A is a partial side elevation of two lengths of fishing line looped together in a manner which facilitates securement to the line splicer shown in FIG. 1;

FIG. 1B illustrates a first step in a method of securing one of the looped lines shown in FIG. 1A about one end of the line splicer shown in FIG. 1;

FIG. 1C illustrates a second step where the other looped line is secured about the opposite end of the splicer shown in FIG. 1;

FIG. 1D is a partial side elevation of two lengths of fishing line arranged in a parallel overlapped arrangement which facilitates securement to the line splicer shown in FIG. 1;

FIG. 1E illustrates a first step in a method of securing one of the looped lines shown in FIG. 1D about one end of the line splicer shown in FIG. 1;

FIG. 1F illustrates a second step where the other overlapped line is secured about the opposite end of the splicer shown in FIG. 1;

DETAILED DESCRIPTION OF THE DRAWINGS

Figure 2:
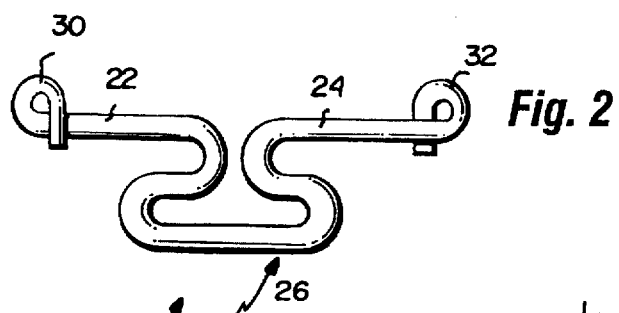
FIG. 2 is a side elevation of a splicer element in accordance with a second exemplary embodiment of the invention.

With reference now to FIG. 1, a splicer element 10 in accordance with this invention includes a relatively straight and relatively rigid wire shank 12 which is formed with open loops or eyes 14, 16 at opposite ends thereof. The eyes or loops 14, 16 are "open" in the sense that they are not welded or otherwise fixed to the shank portion 12, but rather simply abut the shank such that a line may be pulled into the open eye with some force applied. Note that the free ends of the open eyes or loops 14, 16 lie on opposite sides of the shank 12.

Turning to FIG. 1A, a pair of lines L1 and L2 are shown in looped relationship which facilitates connection of the lines L1 and L2 to the splicer 10 shown in FIG. 1. Specifically, and with reference to FIG. 1B, the user holding the lines together in the looped manner shown in FIG. 1A, i.e., with double strands extending in opposite directions, then simply wraps the double strands of one loop about the shank 12 and pulls the double strands into the open eye 16 such that line L1 extends away from the splicer in one direction. The splicer is then turned end-over-end and the double strands of the second loop are wrapped about the shank 12 in the same rotational direction and pulled into the second open loop or eye 14.

It will be appreciated that the lines L1 and L2 need not be looped in the manner shown in FIG. 1A in order to obtain a secure attachment to the line splicer. Rather, the lines may simply overlap in substantially parallel, linear orientation as shown by lines L3 and L4 in FIG. 1D. The overlapped lines may then be wrapped about one end of the shank 12 and pulled into one open eye 16 as best seen in FIG. 1A. After turning the splicer end-over-end, the overlapped lines are wrapped about the second end of the shank 12 and pulled into the open eye 14 as best seen in FIG. 1F.

Figure 2A:
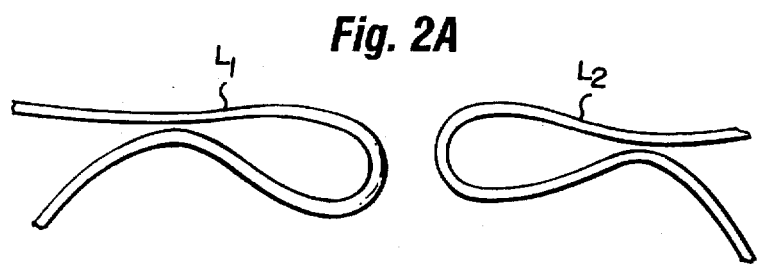
FIG. 2A illustrates a pair of line loops arranged to facilitate connection with a line splicer as illustrated in FIG. 2.
Figure 2B:
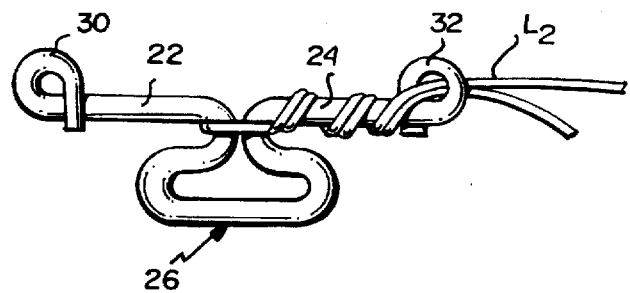
FIG. 2B illustrates a first step in a method of securing one of the lines shown in FIG. 2A about one end of the line splicer illustrated in FIG. 2.
Figure 2C:
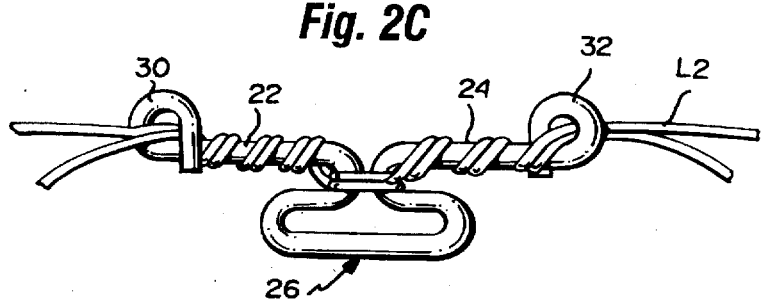
FIG. 2C illustrates a second step where the other looped line is secured about the opposite end of the splicer element shown in FIG. 2.

Turning now to FIG. 2, a line splicer 20 in accordance with a second exemplary embodiment of the invention includes straight shank portions 22 and 24 separated by a T-bend 26. The free ends of the shank portions 22 and 24 are bent to form open loops or eyes 30 and 32, respectively, at opposite ends of the splicer shank portions 22 and 24. With reference to FIG. 2A, lines L1 and L2 are shown in the proximate orientation for attachment to the line splicer 20. With reference to FIG. 2B, the lines L1 and L2 may be looped over the T-bend in opposite directions with overlapped strands of the line L1 wrapped several times about shank portion 22 and then pulled through the open eye 30. After turning the splicer 20 end-over-end, the overlapped strands of the other of the lines L2 are wrapped about the other end of the shank 24 and then pulled through open eye 32 as shown in FIG. 2C.

Figure 3:
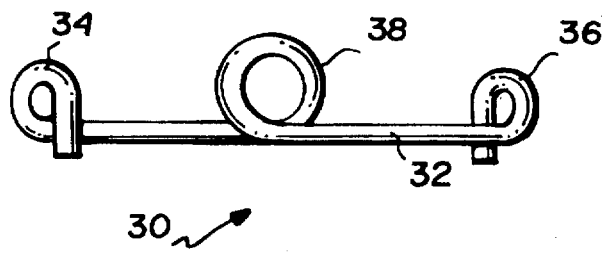
FIG. 3 is a side elevation of a line splicer in accordance with a third exemplary embodiment of the invention.
Figure 3A:
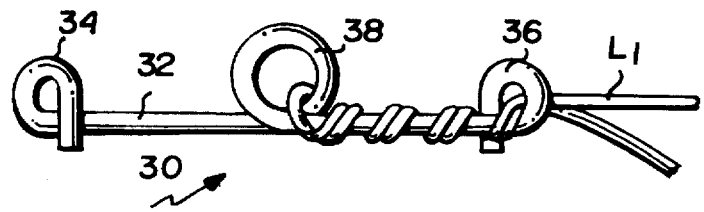
FIG. 3A illustrates a first step in method of securing one of a pair of line loops about one end of the splicer shown in FIG. 3.
Figure 3B:
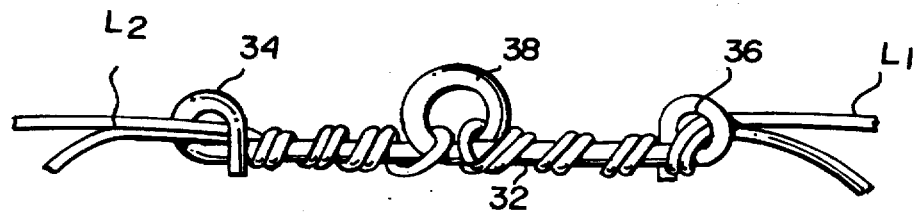
FIG. 3B illustrates a second step where the other looped line is secured about both ends of the line splicer shown in FIG. 3.

Turning now to FIG. 3, a third line splicer 30 in accordance with this invention includes a shank portion 32 having open eyes or loops 34 and 36 at opposite ends thereof, but also formed with a larger open loop or eye 38 intermediate the open eyes 34 and 36. FIG. 3A illustrates the manner in which one of a pair of looped lines L1 (similar to the orientation shown in FIG. 2A) can be pulled into the open eye 38 and overlapped strands of that line then wrapped about a shank portion 32 and pulled into the open eye 36. After turning the splicer 30 end-over-end, the other looped line L2 is then pulled into the open eye 38, and overlapped strands of line L2 wrapped about the shank 32 on the other side of the eye 38, and then pulled into the eye 34 as shown in FIG. 3B.

Figure 4:
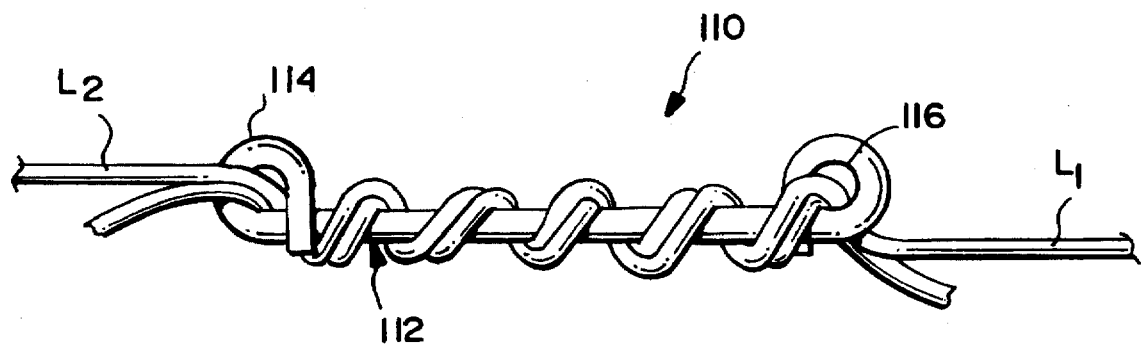
FIG. 4 illustrates a new strand wrapping technique for the splicer illustrated in FIG. 1.

It has now been discovered that a particularly advantageous wrapping procedure provides a spice of superior and unexpected strength. In FIG. 4, a line splicer 110 is illustrated which is similar to the splicer 10 in FIG. 1. For convenience, the various parts of the splicer are referred to using reference numerals similar to those used in FIG. 1, but with the prefix "1" added. The manner of wrapping the two lines (oriented as shown in FIG. 1D) is generally similar to that shown in FIGS. 1E and 1F but with a significant distinction. When the overlapped lines L3 and L4 are first wrapped in one direction, from the approximate center of the shank 112 toward the eye 116, they are held fixed between the thumb and forefinger so that the natural wrist action during wrapping of the lines causes the lines to twist or intertwine about each other. The lines are then pulled into the open eye 116. After turning the splicer 110 end over end, the remaining portion of the overlapped lines L3, L4 are similarly wrapped about the shank 112 towards eye 114, and then pulled into the eye 114. The finished splice is shown in FIG. 4, and note the intertwining of the lines L3, L4 along the length of the shank 112. This same wrapping technique is, of course, equally applicable with the looped lines of FIG. 1A and the splicers shown in FIGS. 2 and 3.

As the line portions are wrapped about the shank, they tend to overlap once for each wrap. While the number of wraps per se is not critical, it should be pointed out that the tensile load is apparently evenly distributed between the overlaps along the length of the shank. Thus, the load is increasingly diffused as the number of wraps is increased.

This arrangement provides an extremely strong splice joint, often exceeding the tensile strength of the line. In fact, for typical fishing applications, when tested to failure, the line fails before the splice.

It should be appreciated that the splicer devices of this invention are effective with any conventional fishing line including monofilament, braided, and even Kevlar™. It should also be emphasized that it has been determined that the splicers in accordance with this invention have strengths equal at least to the tensile strength of the various lines.

While the above examples are directed toward the fishing field, the splicers described herein have applicability in virtually any situation where strands of material, including wires, cables, chains and the like require axial connection via splices. In all cases, knots are not required to achieve a strong splice.

While the invention has been described in connection with what is presently considered to be the most practical and preferred embodiment, it is to be understood that the invention is not to be limited to the disclosed the embodiment, but on the contrary, is intended to cover various modifications and equivalent arrangements included within the spirit and scope of the appended claims.

What is claimed is:

1. A combination line splicer and line connection wherein the splicer consists of a relatively straight and relatively rigid shank, formed with a pair of open eyes, one at each of two opposite ends thereof; and a pair of lines securely fastened to the splicer by a knotless arrangement wherein respective ends of said pair of lines are overlapped in a substantially linear, parallel orientation and wrapped about the shank such that said pair of overlapped ends of said lines are intertwined, and pulled into respective ones of said pair of open eyes.

2. A combination line splicer and line connection wherein the splicer consists of a relatively straight and relatively rigid shank, formed with a pair of open eyes, one at each of two opposite ends thereof; and a pair of lines securely fastened to the splicer by a knotless arrangement wherein the lines are first looped about each other and then doubled back to form a pair of strands for each line, wherein the strands of each line are wrapped about the shank such that the strands are intertwined and pulled into respective ones of said pair of open eyes.

3. A combination line splicer and line connection wherein the splicer consists of a relatively straight and relatively rigid shank, formed with a pair of open eyes, one at each of two opposite ends thereof; wherein a hollow T-bend is formed in the shank, intermediate the open eyes; and a pair of lines securely fastened to the splicer by a knotless arrangement wherein ends of one line are first looped about said T-bend and doubled back to form a first pair of strands extending in one direction, and wherein said first pair of strands are wrapped about the shank in said one direction such that said first pair of strands are intertwined, and pulled into one of said pair of open eyes; and wherein ends of the other line are looped about said T-bend and doubled back to form a second pair of strands extending in an opposite direction and wherein said second pair of strands are wrapped about the shank in said opposite direction such that said second pair of strands are intertwined and pulled into the other of said pair of open eyes.

4. A conmbination line splicer and line connection wherein the splicer consists of a relatively straight and relatively rigid shank, formed with a pair of open eyes, one at each of two opposite ends thereof; wherein a third open eye is formed in the shank between the pair of open eyes; and a pair of lines securely fastened to the splicer by a knotless arrangement wherein ends of one line are first looped and then doubled back to form a loop and a first pair of strands extending in one direction, and wherein said loop is pulled into the third open eye and said first pair of strands are wrapped about the shank in said one direction such that the strands are intertwined, and pulled into one of said pair of open eyes; and wherein ends of the other line are looped and doubled back to form a second loop and a second pair of strands extending in an opposite direction and wherein said second loop is pulled into said third open eye and said second pair of strands are wrapped about the shank in said opposite direction such that said second pair of strands are intertwined and pulled into the other of said pair of open eyes.

5. A method of securing a pair of lines extending in generally opposite directions to a splicer, wherein the splicer includes a shank and open eyes on opposite ends of said shank, said shank for securing said pair of lines to said splicer in a knotless manner, the method comprising the steps of:

a) orienting ends of the lines in generally overlapped relationship;

b) wrapping a first portion of the overlapped ends about a first portion of the shank such that the overlapped lines become intertwined, and pulling said first portion of said overlapped ends into one of the open eyes;

c) turning the splicer end-over-end and wrapping a second portion of the overlapped ends about a second portion of the shank such that the overlapped lines become intertwined, and pulling said second portion of said overlapped ends into the other of the open eyes.

6. The method of claim 5 wherein the open loops have free ends which engage, respectively, opposite sides of the shank.

7. The method of claim 5 wherein, during step a), the lines are looped about each other.

8. The method of claim 5 wherein, during step a), the lines are overlapped in substantially parallel relationship.

9. A method of securing a pair of lines extending in generally opposite directions to a splicer, wherein the splicer includes a shank portion, a pair of open eyes at respective opposite ends of the shank, and a line attachment structure formed in the shank intermediate the pair of open eyes, comprising the steps of:

a) looping a first line about the line attachment structure to form first overlapped strands;

b) wrapping the first overlapped strands about the shank portion towards one of the pair of open eyes so that the first overlapped strands are intertwined, and pulling the first overlapped strands into the one open eye;

c) looping a second line about the line attachment structure to form second overlapped strands; and d) wrapping the second overlapped strands about the shank portion towards the other of the pair of open eyes so that the second overlapped strands are intertwined, and pulling the second overlapped strands into the other of the open eyes.

* * * * *